United States Patent [15] 3,686,321
Mueller et al. [45] Aug. 22, 1972

[54] PRODUCTION OF 2-METHYLHEPT-1-EN-6-ONE

[72] Inventors: Herbert Mueller, Frankenthal; Hermann Overwien, Ludwigshafen, both of Germany

[73] Assignee: Badische Anilin- & Soda-Fabrik Aktiengesellschaft, Ludwigshafen/Rhine, Germany

[22] Filed: Jan. 18, 1971

[21] Appl. No.: 107,589

[52] U.S. Cl. .............................. 260/593 R
[51] Int. Cl. .............................. C07c 49/20
[58] Field of Search ................... 260/593 R

[56] References Cited

FOREIGN PATENTS OR APPLICATIONS 1,209,199  10/1970  Great Britain ......... 260/593 R

*Primary Examiner*—Leon Zitver
*Assistant Examiner*—Leo B. DeCrescente
*Attorney*—Johnston, Root, O'Keeffe, Keil, Thompson & Shurtleff

[57] ABSTRACT

A process for the production of 2-methylhept-1-en-6-one by heating 2,2,6-trimethyl-3,4-dihydropyran in the presence of isobutene at a temperature of from 200° to 400° C.

1 Claim, No Drawings

PRODUCTION OF 2-METHYLHEPT-1-EN-6-ONE

The present invention relates to a new process for the production of 2-methylhept-1-en-6-one.

It is known from U.S. Pat. No. 2,628,252 that this compound can be prepared by adding on isobutene to butenone at superatmospheric pressure and elevated temperature. There is formed however a considerable amount of 2,2,6-trimethyl-3,4-dihydropyran, a compound which hitherto it has not been possible to exploit.

We have now found that 2-methylhept-1-en-6-one is obtained when 2,2,6-trimethyl-3,4-dihydropyran is heated to 200° to 400° C in the presence of isobutene.

It is a special advantage of this process that it is not necessary to use pure isobutene as a starting material but that fractions of $C_4$ hydrocarbons which contain isobutene may also be used. Fractions having isobutene contents of at least 50 percent, particularly of from about 60 to 95 percent, are preferred.

2,2,6-trimethyl-3,4-dihydropyrane often occurs as a byproduct in the production of 2-methylhept-1-en-6-one, for example in the process of U.S. Pat. No. 2,628,252. It may however be obtained by other methods.

The molar ratio of isobutene to 2,2,6-trimethyl-3,4-dihydropyran may vary within wide limits, for example from 1:1 to 100:1, but molar ratios of from 10:1 to 50:1 are especially recommended.

The reaction is preferably carried out at from 250° to 350° C. Superatmospheric pressure is generally used, particularly from 50 to 500 atmospheres, preferably from 100 to 350 atmospheres.

The reaction may be carried out batchwise or continuously in the presence or absence of an inert solvent such as hexane, octane, benzene, toluene, diethyl ether, tetrahydrofuran, dioxan, methanol, ethanol or propanol.

The reaction mixture is worked up by conventional methods, for example by fractional distillation.

The 2-methylhept-1-en-6-one obtained according to the invention is a valuable intermediate for the production of odorants and compounds of the carotenoid series. For example the valuable perfume linalool is obtained in a simple manner from 2-methylhept-1-en-6-one by ethynylation followed by partial hydrogenation.

The following Example illustrates the invention.

EXAMPLE

A mixture of 10 liters of isobutene (105 moles) and 800 g of 2,2,6-trimethyl-3,4-dihydropyran (6.35 moles) is continuously fed per hour at 320° C and 240 atmospheres into an autoclave having an effective capacity of 6 liters. After conventional working up by distillation, 2-methylhept-1-en-6-one is obtained in a yield of 87 percent based on the amount of 2,2,6-trimethyl-3,4-dihydropyran reacted. Conversion is 62 percent; unreacted starting compound is returned to the reaction cycle.

We claim:

1. A process for the production of 2-methylhept-1-en-6-one which comprises contacting 2,2,6-trimethyl-3,4-dihydropyran with isobutene in a molar ratio of from 1:1 to 1:100 at a temperature of from 200° to 400° C and a pressure of from 50 to 500 atmospheres.

* * * * *

PO-1050
(5/69)

UNITED STATES PATENT OFFICE
CERTIFICATE OF CORRECTION

Patent No. 3,686,321  Dated August 22, 1972

Inventor(s) Herbert Mueller, Hermann Overwien

It is certified that error appears in the above-identified patent and that said Letters Patent are hereby corrected as shown below:

Cover page, insert -- [30] Foreign Application Priority Data
Jan. 27, 1970 Germany
P 20 03 462.2 --.

Signed and sealed this 19th day of March 1974.

(SEAL)
Attest:

EDWARD M. FLETCHER, JR.
Attesting Officer

C. MARSHALL DANN
Commissioner of Patents